Figure 1:
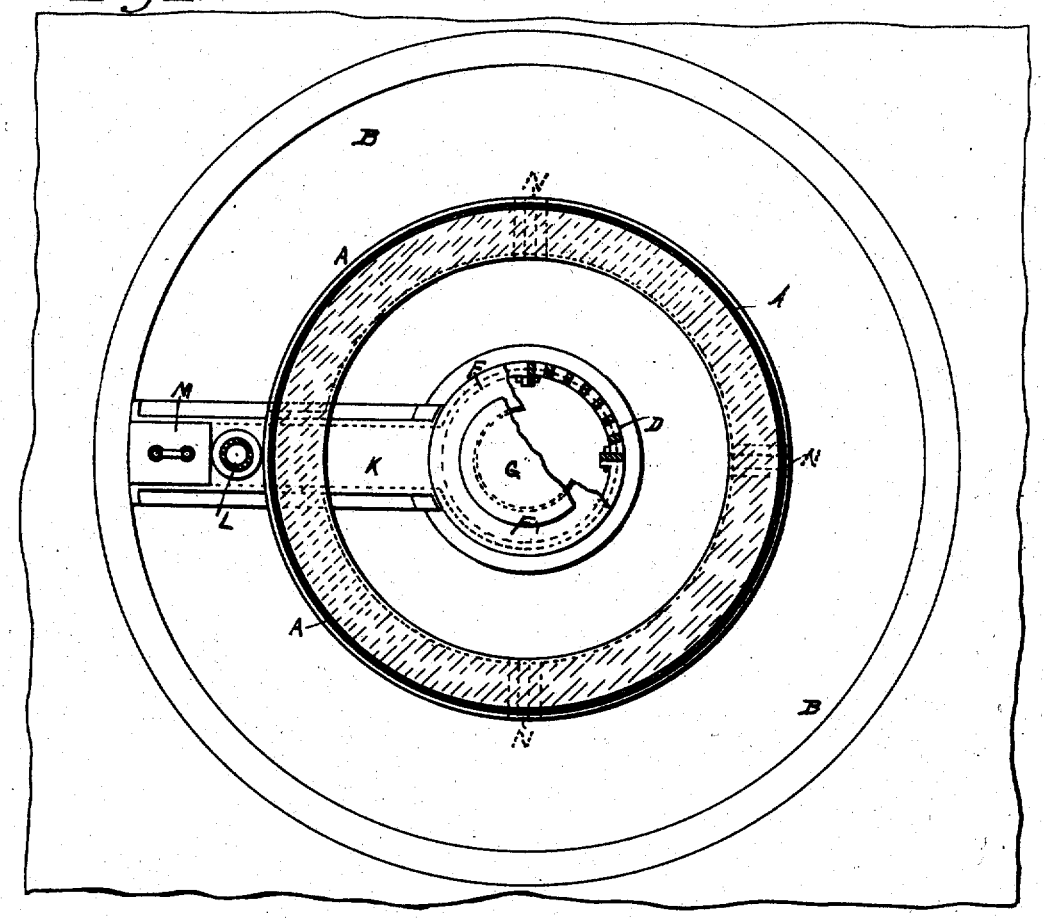

No. 12,367. REISSUED JULY 4, 1905.

A. B. DUFF.

GAS PRODUCER.

APPLICATION FILED MAY 15, 1905.

WITNESSES
Paul A. Blair
Walter Abbe

INVENTOR
Alfred Barker Duff
BY
Howson and Howson
ATTORNEYS

PHOTO LITHOGRAPHED BY SACKETT & WILHELMS LITHO. & PT'G CO. NEW YORK.

No. 12,367. Reissued July 4, 1905.

UNITED STATES PATENT OFFICE.

ALFRED BARKER DUFF, OF PITTSBURG, PENNSYLVANIA.

GAS-PRODUCER.

SPECIFICATION forming part of Reissued Letters Patent No. 12,367, dated July 4, 1905.

Original No. 786,200, dated March 28, 1905. Application for reissue filed May 15, 1905. Serial No. 260,603.

*To all whom it may concern:*

Be it known that I, ALFRED BARKER DUFF, a subject of the King of Great Britain and Ireland, residing in the city of Pittsburg, in the county of Allegheny, State of Pennsylvania, have invented certain new and useful Improvements in Gas-Producers, of which the following is a specification.

My invention has for its object to improve the construction of gas-producers and increase their efficiency by providing for the more regular and efficient distribution of air or of air and steam to the fuel being gasified in the producer.

In gas-producers as hitherto generally constructed the air (or air and steam) has either been distributed by means of gratings placed more or less vertically in a bottom casing or by means of a louvered cone or hood delivering the air either downwardly or more or less horizontally; but both these known forms of blowing arrangements are defective when either is used alone in producers where the production of ammonia is desired, as in such producers a large amount of steam is used, and while the fuel must first get only sufficient air to enable it to be well ignited, yet the blast must not be delivered too much at one point or be too concentrated even if delivered at more than one point, as this would cause too high a temperature at such point or points and lead to the destruction of the ammonia produced.

According to my present invention I combine these two methods of introducing the air or air and steam to the producer, superimposing the louvered cone on a casing having more or less vertical gratings. With this improved combined construction greater rapidity of action is secured, while the fuel is more perfectly reduced to ashes, as while the combined blowers work simultaneously the streams of air or air and steam from the two blowers at the same time act consecutively upon the fuel as the latter moves downward, the upper conical blower delivering air to light up the fuel to incandescence, while the lower grating causes the air to act upon the fuel with a finer distribution, completely reducing the remaining partly-gasified fuel to ashes, and both these actions taking place without raising the temperature at any one point high enough to destroy the ammonia produced.

In order that my invention and the manner of performing the same may be properly understood, I hereunto append a sheet of explanatory drawings, to be hereinafter referred to in describing the improvements.

Figure 2:
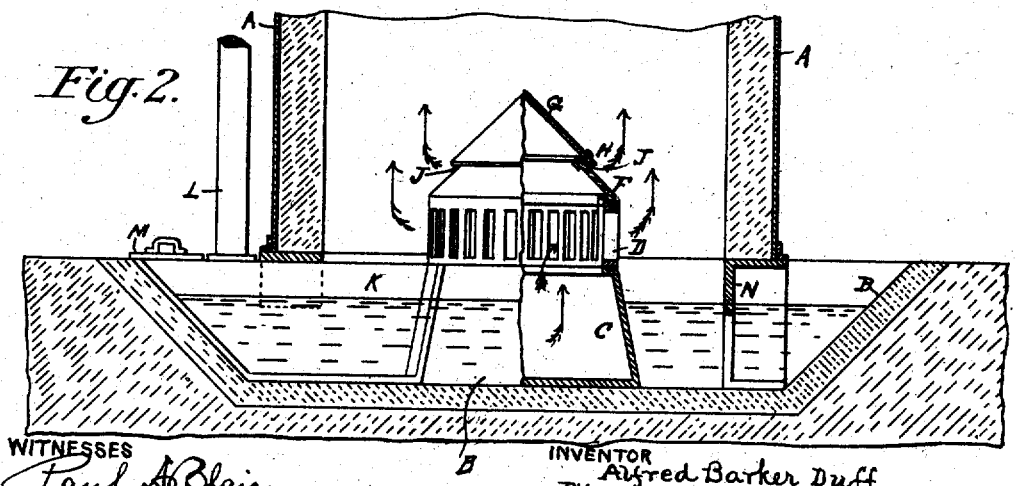

In the drawings, Figure 1 is a sectional plan, and Fig. 2 a sectional elevation, of part of a gas-producer having my improvements applied thereto.

As shown in the drawings, the shell A of the producer, lined with fire-bricks, is circular in plan, the lower edges of the shell dipping, as usual, into the water in an ash-trough B, the water forming a gas-tight seal and the ashes or residues descending into the water seal being removed by means of rakes, as usual.

In the center of the trough B there is built a casing C, upon which is superposed a ring of vertical gratings D, which, however, may be more or less inclined and which is preferably made up of sections bolted together, as shown in plan, Fig. 1. On the top of this ring of gratings D there is placed a conical louver-ring F, and on the top of the ring F a cover G is secured by bolts and distance-pieces H at intervals, so that an air-space J is left between the ring F and cover G, and the whole forms a louvered cone or hood having a closed top. Instead of there being only one louver-ring F there may be a number, these rings being secured in position by bolts and distance-pieces, so as to leave the air-spaces J between each and being in all cases surmounted by a cover G.

The air or air and steam for combustion or gasification of the fuel is supplied to the casing C through a duct K, communicating outside the producer-shell A with a blower-pipe L. The air (or air and steam) passes from the casing C into the producer both through the gratings D and the air-space (or spaces) J and acts on the fuel in the improved manner hereinbefore described. The duct K is provided with a door M, through which a rake can be inserted to clean out any residues which may become deposited in the casing C. The duct K forms one of the supports for the producer-shell A, other supports N of the usual form being also provided.

It is to be understood that the other parts (not shown) of the gas-producer are constructed and arranged in any suitable known manner and also that the producer-shell instead of being circular in plan may be square or of other desired shape. In this case the improved combined blower described will be shaped to suit the internal space in the producer—that is, it may be arranged to only occupy the center of the producer, or it may be arranged to extend from one side of the producer-casing to the other side in the form of a casing, carrying a more or less vertical grating, with the cone part taking the form of an angular louvered hood or cover.

What I claim as my invention is—

In combination, a gas-producer, a water-sealed ash-trough therefor, an air-receiving casing in the ash-trough, substantially vertical gratings carried on the casing and distributed over a large area, a free space for the fall of ashes between the air-casing and producer-walls, a louvered cone superimposed on the gratings, said cone consisting of a louvered ring above the casing, and a cover superimposed thereon so as to leave air-space in the wall of the cone, said air-spaces in the cone and grating being so proportioned that a sufficient quantity of air is made to act on the upper part of the fuel and light that part up to incandescence, while the lower grating causes the air to act upon such ignited fuel as it descends with a finer distribution and without raising the temperature at any point too high.

In testimony whereof I have signed my name to this specification in the presence of two subscribing witnesses.

ALFRED BARKER DUFF

Witnesses:
JOHN ANDERSON BARKER,
ROBERT HENRY HILL.